No. 737,944. PATENTED SEPT. 1, 1903.
D. LUBIN.
POWER DEVICE.
APPLICATION FILED MAR. 13, 1903.
NO MODEL. 3 SHEETS—SHEET 1.
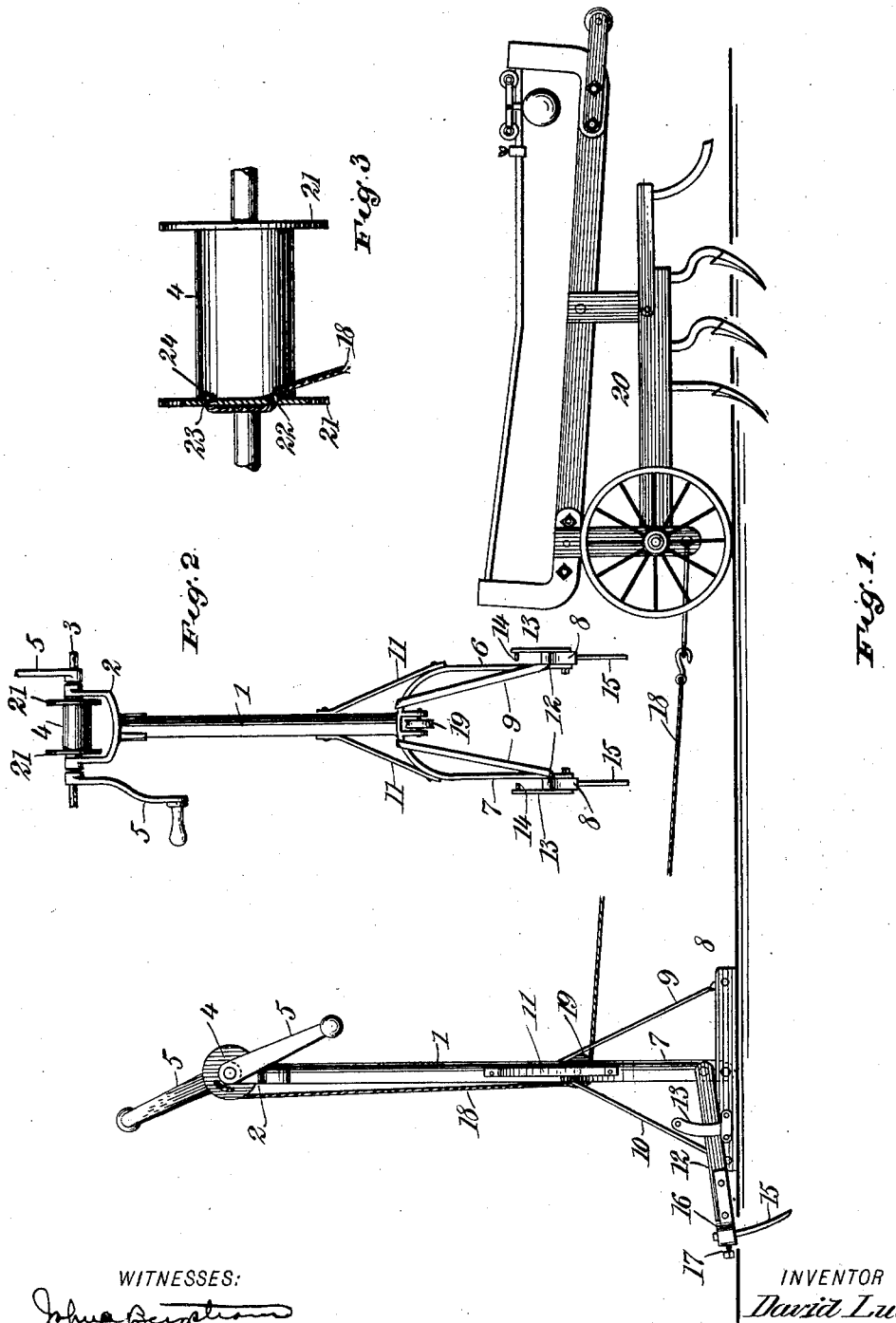
WITNESSES:
INVENTOR
David Lubin
BY
ATTORNEYS.

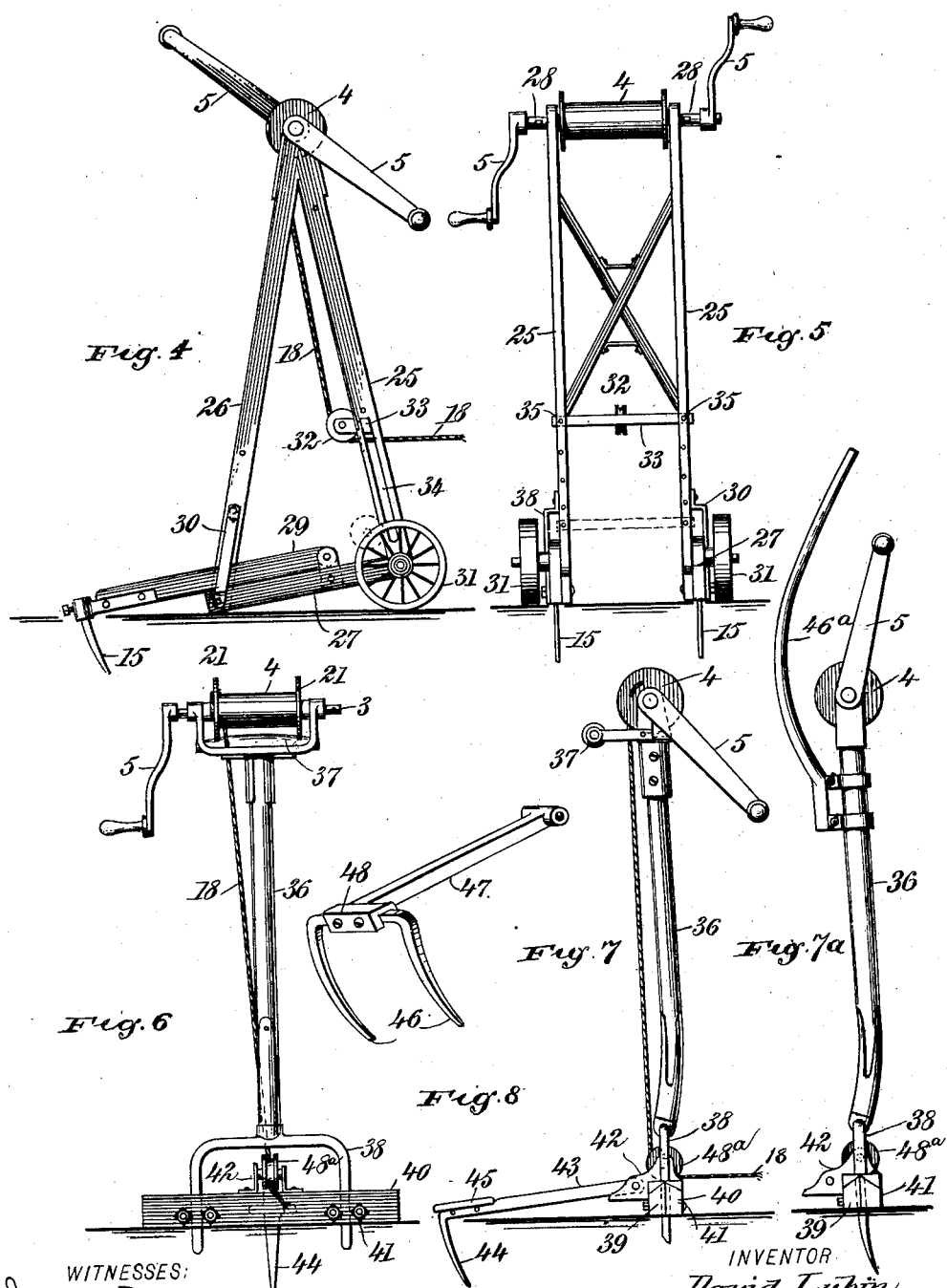

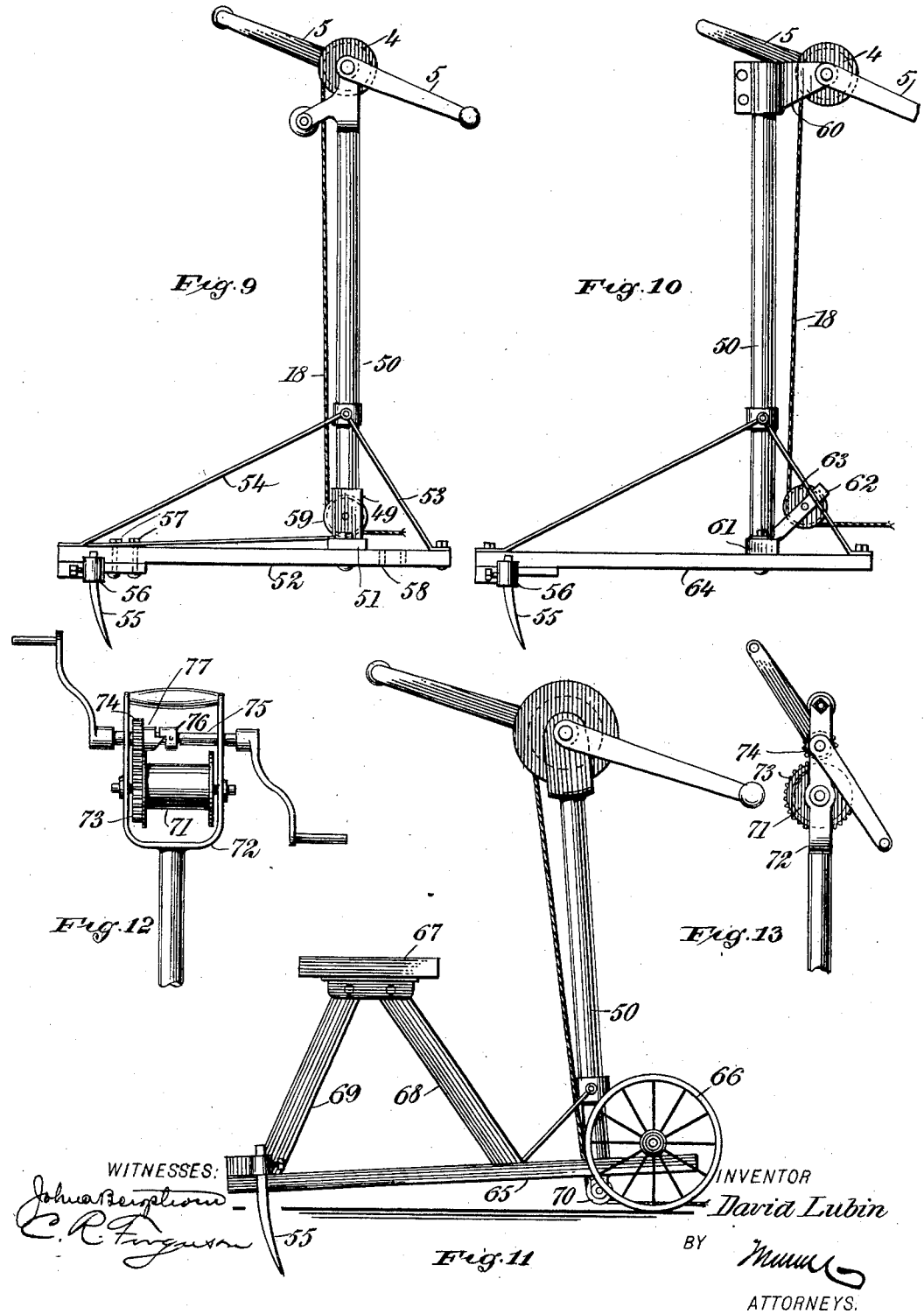

No. 737,944.

Patented September 1, 1903.

UNITED STATES PATENT OFFICE.

DAVID LUBIN, OF NEW YORK, N. Y.

POWER DEVICE.

SPECIFICATION forming part of Letters Patent No. 737,944, dated September 1, 1903.

Application filed March 13, 1903. Serial No. 147,600. (No model.)

*To all whom it may concern:*

Be it known that I, DAVID LUBIN, a citizen of the United States, and a resident of the city of New York, borough of Manhattan, in the county and State of New York, have invented a new and Improved Power Device, of which the following is a full, clear, and exact description.

This invention relates to improvements in power devices particularly adapted for drawing a cultivator or other agricultural implement through the ground to finely pulverize or break the earth around and between rows of plants or to draw such implement through unplanted ground, an object being to provide a device of this character designed to be operated manually and by means of which a comparatively heavy tool may be operated with but very little manual exertion and digging deeply into the ground.

I will describe a power device embodying my invention and then point out the novel features in the appended claims.

Reference is to be had to the accompanying drawings, forming a part of this specification, in which similar characters of reference indicate corresponding parts in all the figures.

Figure 1 is a side elevation of a power device embodying my invention, showing it in connection with an agricultural implement. Fig. 2 is a front elevation of the device. Fig. 3 is a detail illustrating a means for attaching a draw-line to the winding-drum. Figs. 4 and 5 are respectively side and front elevations of a modification. Figs. 6 and 7 are respectively front and side elevations showing another modification. Fig. 7ª is an elevation showing a modification. Fig. 8 is a perspective view showing an anchoring device that may be used in lieu of that shown in Figs. 6 and 7. Figs. 9, 10, and 11 are side elevations showing other modifications, and Figs. 12 and 13 are front and side elevations showing a gear mechanism that may be employed for the winding-drum.

Referring first to the example of my improvement shown in Figs. 1 and 2, 1 designates a standard having at its upper end a yoke 2, in which a shaft 3 of a winding-drum 4 has its bearings, and on the opposite end of this shaft are the operating-cranks 5. Attached to the lower end of the standard is a frame comprising downwardly-extended members 6 7, which are spaced apart, so as to straddle plants in a row when it is desired to draw an implement over the ground to cultivate the ground at the sides of the plants. Attached to the lower ends of the frame members 6 7 are horizontal bars 8, designed to rest upon the ground. These bars extend forward and rearward, so that the device will be held firmly from tilting forward or rearward when in operation. The said bars 8 are connected to the upper portion of the frame by means of braces 9, and braces 10 connect the rearward extensions of said bars with said frame, and braces 11 firmly connect the frame with the standard. Pivotally connected to the members 6 7 of the frame are rearwardly extended arms 12, which are guided in their up and down movements by uprights 13, secured to said bars, and inwardly-extended pins 14 on said uprights prevent the arms from moving too far upward. Anchoring devices are carried at the ends of these arms 12. As here shown, these anchoring devices consist of teeth 15, removably secured in clips 16, attached to the arms. By this arrangement as a set of teeth becomes worn out a new set may be readily inserted, or the teeth may be adjusted vertically and held by means of set-screws 17, as occasion may require. From the drum 4 a draw-line or cable 18 extends down and around a pulley 19, supported in the upper portion of the frame members 6 7, and from this pulley the draw-line extends to a connection with an agricultural implement here shown as a cultivator 20, designed to cultivate the ground on opposite sides of a plant and the construction of which need not be further described herein, as it is described and claimed in another application filed by me under date of February 3, 1903, Serial No. 143,955. As a convenient means for attaching the end of the draw-line 18 to the winding-drum 4 I provide one of the flanges 21 of the drum with two holes 22 23, and the end of the rope is passed from the inside outward through the hole 22 and thence inward through the hole 23, where it is knotted, as indicated at 24 in Fig. 3. Other means of securing the draw-line of course may be employed without departing from the spirit of my invention.

In the operation of this device when the agricultural implement is at a standstill the anchoring devices are to be drawn out of the ground and then the power device moved rearward to any desired distance—say one hundred feet. Then after placing it in position one of the anchoring devices 15 is to be forced into the ground by one foot of the operator, and then the other anchoring device is to be forced into the ground by the other foot of the operator. The operator then while standing upon the upper ends of the anchoring devices or on the arms 12 will operate the drum 4, drawing the implement forward until it reaches a point near the power device, when said power device is to be again moved backward and the operation continued.

In the example of my improvement shown in Figs. 4 and 5 the standard comprises a frame consisting of front members 25 and the rear members 26 and the bottom rearwardly-extended members 27, the parts 25 and 26 of a side being divergent from the top downward, and in the upper portion the winding-drum 4 is mounted.

It may be here stated that in this example I provide a clutch connection between the crank-handles and the drum-shaft. As here shown, this clutch consists of a lug 28 on the shaft designed to engage in recesses formed in the crank-handles. When the cranks are moved into engagement with these lugs 28, the drum will be operated by said handles; but when the machine is moved rearward and the draw-line unwinds the handles will be moved out of engagement with said lugs, so that the drum may be rotated freely.

Anchor-carrying arms 29 have swinging connection with the members 27 of the frame or standard, and they are guided between straps 30 and the rear members 26, and carried by these arms 29 are the teeth 15, like those first described. The standard is supported at its front portion by wheels or rollers 31, so that it may be readily drawn over the ground when moving it rearward. The draw-line 18 extends from the winding-drum around a pulley 32, carried by a bar 33, adjustable vertically in slots 34, formed in the members 25 of the standard. By this arrangement the pulley 32 may be adjusted to any desired elevation to cause the front tines of the agricultural implement to dig more or less deep into the ground. It may be held as adjusted by means of pins 35, passing through perforations in the bar 33 and through perforations in the members 25. When the bar is in its uppermost position or approximately thereto, the device may be used for straddling plants, as in the device first described.

In the example of my improvement shown in Figs. 6 and 7 a standard 36 is provided at its upper end with a rearwardly-extended handle 37 and at its lower end with tines 38, which are designed to be clamped between the clamp-bars 39 40 by means of bolts 41, and the tines, it will be noted, extend slightly below said bars, so as to engage in the ground and aid materially in the anchoring of the device. Attached to one of said members is a frame or casting 42, which has a rearward extension in which an anchor-carrying arm 43 is mounted to swing. At the end of this anchor-carrying arm is an anchor-tooth 44, and on the upper side of the arm is a foot-plate 45. This single tooth 44 in connection with the extensions of the tines 38 will form an effectual anchor; but instead of the single tooth I may employ two teeth 46, attached to an arm 47, designed to be pivoted to the frame or casting 42, and a part 48, receiving the connecting-bar of the teeth 46, forming a foot-plate. Also mounted in the frame or casting 42 is a pulley 48$^a$, around which the draw-line 18 passes. In the operation of this device when in position the projected ends of the tines 38 are to be forced into the ground, and then the tooth 44 or the teeth 46 are to be forced into the ground by foot-pressure, and then while the operator is standing on the foot-plate the winding-drum may be operated.

In Fig. 7$^a$ I show a device particularly designed for light work and in which the platform is omitted, and in lieu of the platform I employ an extension-handle 46$^a$, adjustable vertically on the standard. By grasping this handle considerably above the drum the leverage or holding power is substantially the same as pressure or weight on the platform.

The devices shown in Figs. 9 and 10 are designed to be used when the tool is to be drawn over ground in which there are no grown plants or between rows of growing plants.

In Fig. 9 a frame 49 is attached to the lower end of a standard 50, and on the cross-bar 51 of this frame are the ground bearing-arms 52, which extend forward and rearward of said bar 51 and are suitably secured by braces 53 54. The anchor-teeth 55 of this example are removably secured in castings 56, that may be attached to the rearward extensions of the parts 52 by means of bolts 57, or they may be attached to said parts 52 forward of the standard 50 by passing the bolts through openings 58. Arranged in the frame 49 is a pulley 59, around which the draw-line 18 passes, the portion of said draw-line between the pulley and drum being extended along the rear side of the standard.

In Fig. 10 the standard 50 has a forwardly-extended yoke 60 at its upper end in which the winding-drum is operated, and on the lower end of the standard is a cross-bar 61, having upwardly and outwardly projecting arms 62, in which a pulley 63 for the draw-line is supported. Attached to the ends of the cross-bar 61 are ground bearing portions 64, which extend rearward and forward of the standard and support the anchoring-teeth 55 at the rear end.

In Fig. 11 I have shown a device on which the operator may sit to firmly hold the anchoring devices in the ground. In this example the lower portion of the standard 50 is attached to a ground-frame 65, on the forward extensions of which ground-wheels 66 are mounted and on the rear ends are the anchoring-teeth 55. A seat 67 is supported from the frame 65 by standards 68 69. In this example a lower pulley 70 is located at the lower end of the standard below the frame, so that a slight downward draw may be imparted to the agricultural implement. This pulley, however, is removable, so that it may be placed at a higher point on the standard when the machine is used to straddle plants. The operation of this device is substantially the same as hereinbefore described.

In Figs. 12 and 13 I have shown a construction by means of which a maximum of power may be imparted to the winding-drum by a minimum of manual exertion. In this example a winding-drum 71 is mounted in a yoke 72 on the upper end of the standard, and on one end of the drum is a gear 73, engaging a pinion 74, loosely mounted on a power-shaft 75, mounted to rotate in the yoke 72 and to move longitudinally therein. On the shaft 75 is a clutch member 76, and on the pinion 74 is a clutch member 77. While winding the drum the shaft 75 is to be moved longitudinally to engage the member 76 with the member 77; but when moving the power device rearward to a new position the clutch members are to be detachable, so that the drum may be rotated freely.

While I have shown a gear-wheel on the drum and a pinion on the shaft, it is obvious that this arrangement may be reversed without departing from the spirit of my invention.

It will be noted that in each example of my invention the pulley is arranged below the winding-drum, and therefore a direct pull is exerted on the implement, keeping it practically level with all its teeth in the ground during its entire movement, which would not be the case were the cable extended directly from the drum or from a device above the drum, and consequently at a downward incline.

Having thus described my invention, I claim as new, and desire to secure by Letters Patent—

1. A power device, comprising a standard, a winding-drum supported by the standard, a pulley below the drum, and an anchoring device extended rearward from the lower portion of the standard and adapted to be held in the ground by manual pressure.

2. A power device, comprising a standard, a winding-drum supported by the standard, and an anchoring device arranged rearward of the standard and having a vertically-swinging movement.

3. A power device, comprising a standard, a frame on the lower end of said standard comprising spaced members, bars attached to the lower ends of said members and extended forward and rearward therefrom, arms having vertical swinging relation to the standard, anchoring devices carried by the arms, and a winding-drum at the upper portion of the standard.

4. A power device, comprising a standard, a winding-drum at the upper portion of the standard, a pulley at the lower portion of the standard, a draw-line extended from the drum around said pulley, a frame at the lower end of the standard comprising spaced members, bars attached to the lower ends of said members and extended forward and rearward therefrom, rearwardly-extended arms mounted to swing, and anchoring-teeth removably connected to said arms.

5. A power device, comprising a standard, a winding-drum at the upper portion of the standard, a pulley at the lower portion of the standard, a draw-line extended from the drum around said pulley, a frame on the lower end of the standard and comprising spaced members, ground bearing-bars extended forward and rearward therefrom, rearwardly-extended swinging arms, anchoring-teeth carried by said arms, and guides for the arms attached to said bars.

6. A power device, comprising a standard, a frame at the lower portion of the standard, anchoring devices attached to the frame, a winding-drum at the upper portion of the standard, and a pulley supported below the winding-drum.

In testimony whereof I have signed my name to this specification in the presence of two subscribing witnesses.

DAVID LUBIN.

Witnesses:
  JNO. M. RITTER,
  C. R. FERGUSON.